United States Patent [19]
Adams et al.

[11] Patent Number: 5,456,520
[45] Date of Patent: Oct. 10, 1995

[54] VEHICLE FOR TRANSPORTING ALTERNATIVE SUBSTANCES IN ALTERNATIVE CONTAINERS

[75] Inventors: Brook W. Adams, Green Valley, Ariz.; Richard P. Bell, Centerville, Utah; Timmy R. Harvey, Amarillo, Tex.; W. Glen Hicks, Minden, La.; Raymond Housh, Mesa, Ariz.; Oliver K. Kelley; Donald P. Ryan, both of Amarillo, Tex.

[73] Assignee: Jack B. Kelley, Inc., Amarillo, Tex.

[21] Appl. No.: 231,991

[22] Filed: Apr. 21, 1994

Related U.S. Application Data

[63] Continuation of Ser. No. 866,975, Apr. 10, 1992, abandoned.
[51] Int. Cl.$^6$ .................................................. B60P 1/16
[52] U.S. Cl. ........................ 298/22 R; 296/51; 410/78; 105/281; 105/361; 105/454
[58] Field of Search ............................. 105/281, 361, 105/454; 296/51, 146 H; 298/1 A, 12, 22 R; 410/2, 52, 54, 68, 78; 414/477, 559

[56] References Cited

U.S. PATENT DOCUMENTS

| | | | |
|---|---|---|---|
| 1,477,723 | 12/1923 | Smith | 410/80 |
| 2,741,383 | 4/1956 | Leckert. | |
| 2,898,872 | 8/1959 | Hastings, Jr. | 410/80 |
| 3,001,825 | 9/1961 | Rouse | 298/12 X |
| 3,152,837 | 10/1964 | Margala. | |
| 3,155,203 | 11/1964 | Kappen | 296/51 X |
| 3,183,853 | 5/1965 | Terlecky et al. | 105/454 X |
| 3,272,546 | 9/1966 | Cooley. | |
| 4,033,625 | 7/1977 | Fikse. | |
| 4,111,451 | 9/1978 | Pinto. | |
| 4,111,485 | 9/1978 | Martin et al.. | |
| 4,132,326 | 1/1979 | Pinto. | |
| 4,650,205 | 3/1987 | Jarlsson. | |
| 4,877,293 | 10/1989 | French. | |
| 4,943,118 | 7/1990 | Davis. | |

OTHER PUBLICATIONS

Clement Industries Brochure WP/10M/3091/Litho in USA, 1991, entitled "Clement 2–Box Roll–Off Trailer".
Clement Industries Brochure, WP/10M/1100/7–90/Litho in USA, 1990, entitled "Transfer Trailer Set".

*Primary Examiner*—Michael S. Huppert
*Assistant Examiner*—Janice L. Krizek
*Attorney, Agent, or Firm*—Vinson & Elkins

[57] ABSTRACT

A trailer for selectively transporting either a first or second substance is disclosed. The trailer includes a substantially flat bed and has two containers disposed thereon, each of which is capable of storing a different type of substance. An operator may choose to transport materials in either one of the two containers. Accordingly, the container to transport the substance is shifted toward a balanced load distribution point along the trailer while the empty container is moved to one end of the trailer. In the preferred embodiment, the two containers are coupled together so that the movement of one container along the trailer automatically causes a corresponding movement in the other. One container moves along the trailer by virtue of a plurality of wheels while the other slides along rails separated by a bearing. Movement of the containers is preferably accomplished by virtue of a hydraulic-powered winch which advances a chain in order to correspondingly advance a carrier plate longitudinally along the trailer. A tilting mechanism is also included within the trailer for purposes of tilting one of the containers so that any substance stored therein may be exhausted or dumped out of a multi-hinged tailgate. The multi-hinged tailgate of one of the containers permits access to the substance stored therein, either by dumping the substance or by side opening of the tailgate for immediate access to the substance stored within the container.

22 Claims, 3 Drawing Sheets

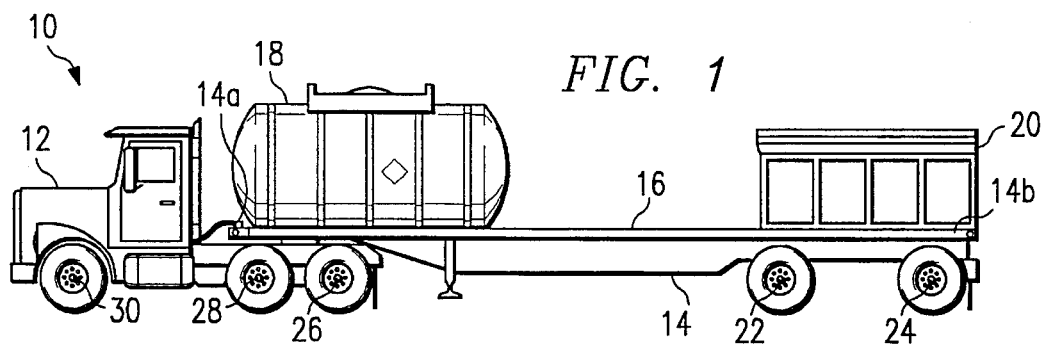
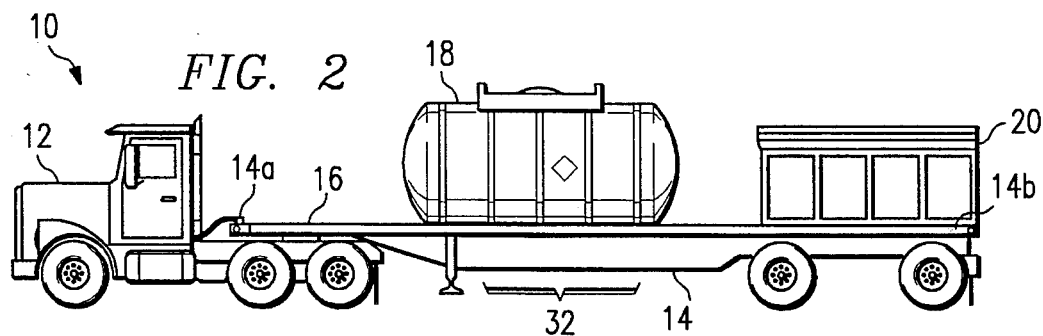
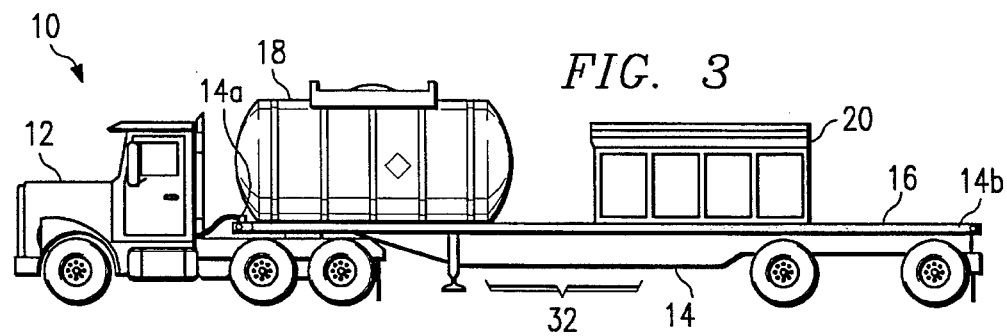
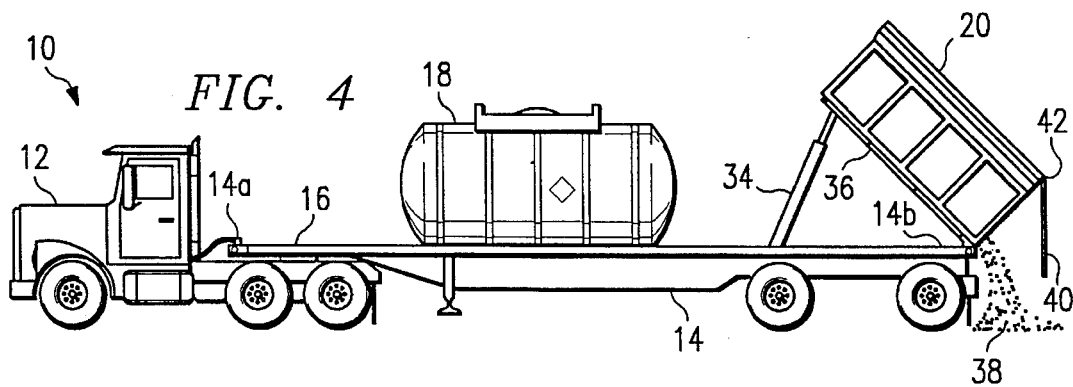

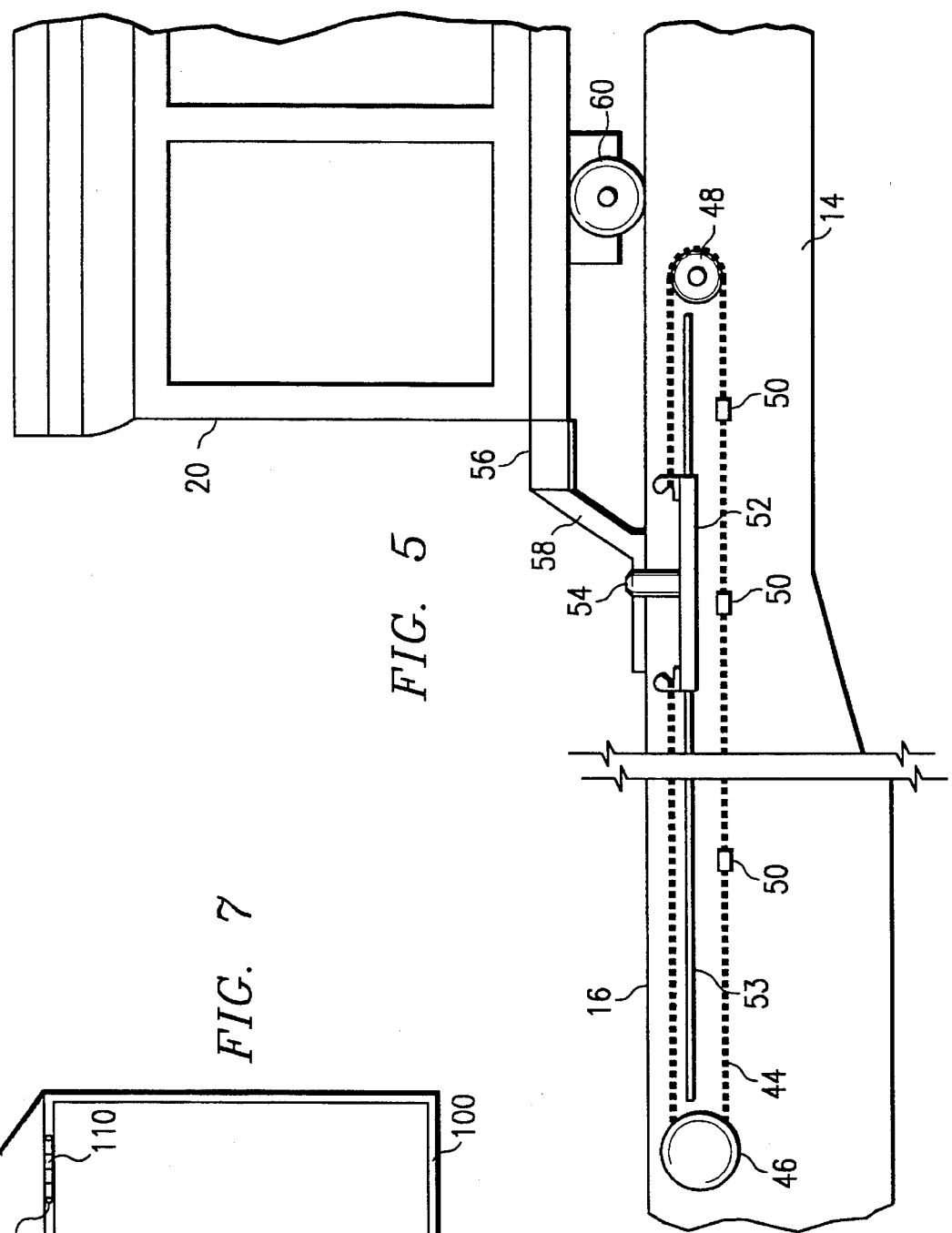

VEHICLE FOR TRANSPORTING ALTERNATIVE SUBSTANCES IN ALTERNATIVE CONTAINERS

RELATED APPLICATIONS

This application is a Continuation of application Ser. No. 07/866,975, filed Apr. 10, 1992, and entitled "VEHICLE FOR TRANSPORTING ALTERNATIVE SUBSTANCES IN ALTERNATIVE CONTAINERS", now abandoned.

TECHNICAL FIELD OF THE INVENTION

This invention relates in general to transportation of substances from one location to another, and more particularly to a vehicle for transporting alternative substances in alternative containers.

BACKGROUND OF THE INVENTION

Transportation of large quantities of substances via large truck and truck/trailer combinations has occurred for at least the past thirty years. Indeed, over these thirty years, various needs and developments have occurred in connection with this industry. For example, U.S. Pat. No. 3,272,546, issued to Cooley on Sep. 13, 1966, illustrates a truck/tractor unit which cooperates with a trailer platform in order to transport a substance-carrying container from one location to another. As another example, U.S. Pat. No. 3,152,837, issued to Margala and entitled "Dumping Semi-Trailer", discloses a double-ended semi-trailer, either end of which may be connected to a tractor for transporting substances stored in a pair of load-carrying bodies. Each of the load-carrying bodies are pivotally connected to the structure so that each may be tilted in an upward fashion to exhaust or dump the stored substance out of the respective load-carrying body.

More recently, it has been recognized that trucks constructed to transport only a single substance give rise to great inefficiencies where it is desirable to transport different substances between different destinations. For example, in mining operations, it is often desirable to carry a mining liquid from the storage site to the mine, and to carry the mined material, such as ore, from the mining site to the storage site. When using prior art trucks capable of transporting only one substance, however, inefficiencies arise because each one-substance truck is only capable of bringing a full load of a single type in one direction (i.e., either fluid from the storage site to the mine, or ore from the mine to the storage site), requiring that its return trip to its original location be made with no load whatsoever. Thus, as the empty one-substance truck returns from its delivery destination, various resources are expended, such as time, fuel, wear and tear on the vehicle and money, while no transportation of substance is being accomplished.

In addition to multiple substance transportation, another challenge which has arisen is that of balanced load distribution during transportation of a substance. In particular, various federal and state regulations apply to the trucking industry which govern the weight distribution of a load on a truck or truck trailer. These rules ensure safety and efficiency when hauling large quantities of substance.

Several prior art attempts have been made to accomplish balanced load distribution. For example, U.S. Pat. No. 4,033,625, issued Jul. 5, 1977, to Fikse, is entitled "Adjustable-Length Semitrailer Chassis and Method of Semitrailer Maneuvering" (the "Fikse Patent"). The Fikse Patent discloses a truck semi-trailer having frames adjustable in length so as to alter the overall length of the trailer. The change in length also changes the distribution of the weight of the trailer and the load which it carries. Another example is U.S. Pat. No. 4,877,293, issued Oct. 31, 1989, to French et al., and entitled "Load Bridging Dump Trailer" (the "French Patent"). The French Patent also discloses a truck trailer with an extendable frame to permit even load weight distribution. A final example is U.S. Pat. No. 4,943,118, issued Jul. 24, 1990, to Davis, and entitled "End Dumping Trailer" (the "Davis Patent"). The Davis Patent discloses a substance-carrying bed for placement on a truck trailer, the bed having wheels for longitudinal movement across the trailer. The bed can be placed toward the middle of the trailer during transportation of a substance, and then rolled to the rear end of the trailer for inclined dumping once the truck has reached its destination.

While purporting to permit load distribution, both the Fikse and French Patents require complex and undoubtedly high cost trailer structure to accomplish their respective results. In addition, the process of changing the effective length of the trailer is believed to require great attention to safety and surroundings during the extension/retraction process. While the Davis Patent does not disclose a changing trailer length, neither it nor the Fikse or French Patents disclose apparatus for accommodating the two-substance problem discussed above.

It is therefore an object of the present invention to provide a vehicle which is capable of transporting multiple substances between locations. As a result of this object, efficiencies are increased while costs are minimized.

It is a further object to provide a two-substance vehicle which permits either substance container to be situated in an appropriate location on the trailer in order to achieve appropriate payload and weight distribution to the wheel axles of the trailer.

It is still a further object of the present invention to permit tilting of at least one of the substance containers in order to exhaust the substance stored therein.

It is yet another object of the present invention to provide multiple hinge configurations on the tailgate opening of a substance container so that the tailgate may be opened in different manners to permit different types of access to the substance stored therein.

Other objects and advantages of the present invention will be apparent to those of ordinary skill in the art having reference to the following specification together with its drawings.

SUMMARY OF THE INVENTION

In accordance with the present invention, a trailer for selectively transporting either a first or second substance is provided which substantially reduces the disadvantages and problems associated with prior trailer vehicles, and seeks to further the objects set forth above.

The present invention includes a trailer for selectively transporting either a first or second substance. The trailer includes a substantially flat surface having a first end, a second end and a balanced load distribution point between the first and second ends of the surface. In addition, the trailer includes a first and second container, each of which is capable of storing a respective substance, and each of which is movably disposed along the trailer surface. Further, the first container is moved to approximately the balanced load distribution point of the surface and the second container is moved to approximately a first end of the surface when transporting one substance. Alternatively, when transporting a second substance, the second container is moved to approximately the balanced load distribution point and the first container is moved to approximately the second end of the surface.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a side elevational view of a truck and trailer, wherein the trailer includes a first and second container in accordance with the present invention;

FIG. 2 illustrates a side elevational view of the trailer of the present invention having the two containers positioned for purposes of transporting a substance in one container while the other is empty;

FIG. 3 illustrates a side elevational view of the trailer of the present invention having the two containers positioned for purposes of transporting a substance in the container which is empty in FIG. 2;

FIG. 4 illustrates a side elevational view of the vehicle of the present invention, wherein the substance in one container is being exhausted by means of a tilting mechanism;

FIG. 5 illustrates a cross-sectional diagrammatical side view of the apparatus for advancing a container longitudinally along the vehicle trailer;

FIG. 7 illustrates a rear perspective view of one of the substance-carrying containers having a tailgate hinged thereto.

DETAILED DESCRIPTION OF THE INVENTION

Figure 6:
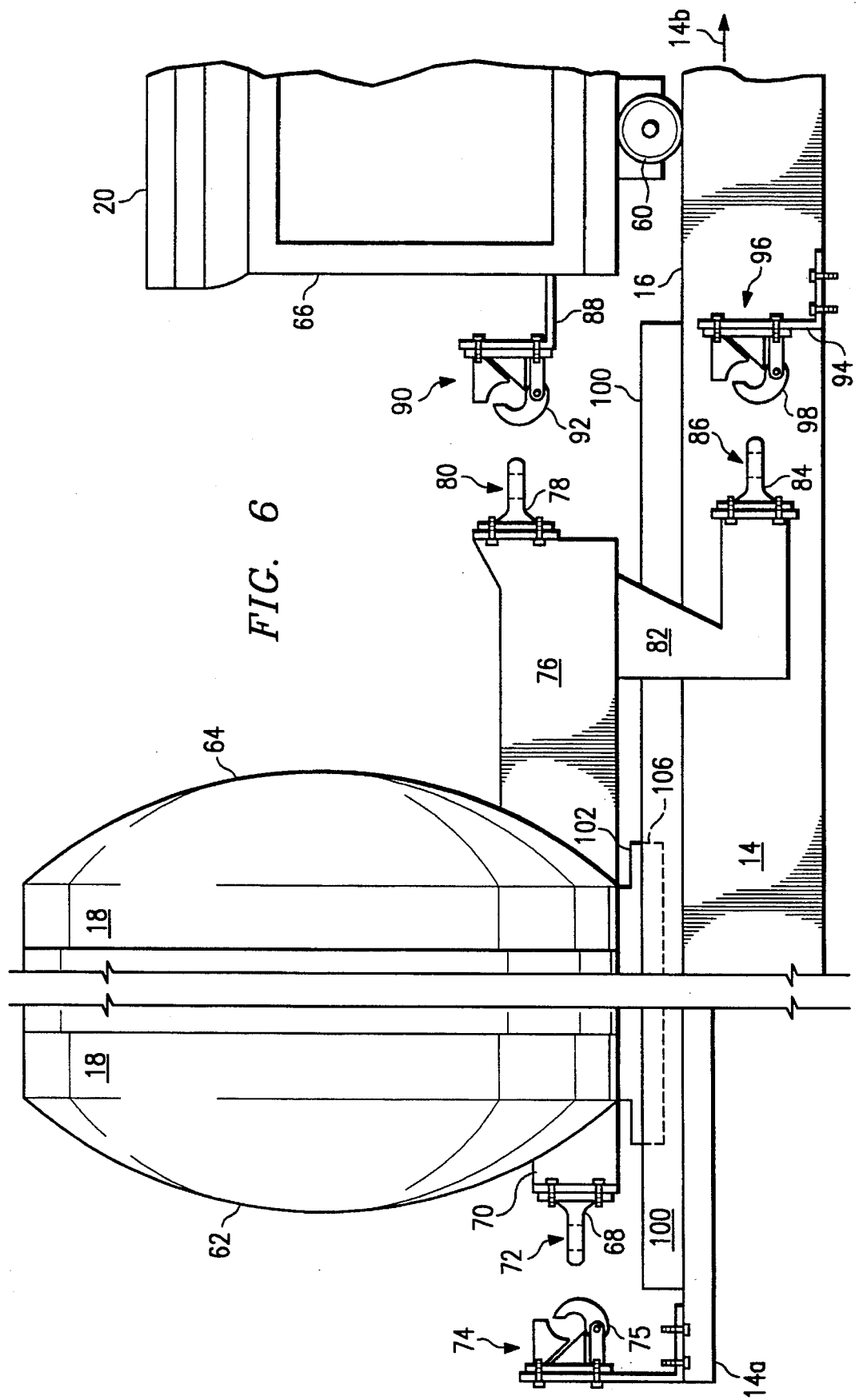
FIG. 6 illustrates a cross-sectional diagrammatical side view of the coupling apparatus for joining the two containers together and maintaining the containers in either one of two positions along the vehicle trailer.

The preferred embodiment of the present invention and its advantages are best understood by referring to FIGS. 1–7 of the drawings, like numerals being used for like and corresponding parts of the various drawings.

FIG. 1 illustrates a vehicle 10 in accordance with the present invention. Vehicle 10 includes a tractor/truck 12, as is commonly known in the transportation art. A trailer 14 is coupled to tractor/truck 12, also as known in the art. Trailer 14 has a front end 14a, a rear end 14b and includes a flat bed 16. Flat bed 16, in the preferred embodiment, includes two parallel flat surfaces running longitudinally down trailer 14. These two parallel surfaces are joined by a plurality of orthogonal cross-members (not shown) for support and stability to the overall structure. While the dual parallel surface is the preferred embodiment, it should be understood that other types of single or multiple surfaces could be used in lieu of the dual surface configuration.

In the illustration of FIG. 1, a first and second container 18 and 20, respectively, are disposed on flat bed 16. In the preferred embodiment, first container 18 is a tank for storing a fluid substance and second container 20 is a hopper for containing dry materials. Each of containers 18 and 20 are generally enclosure structures constructed according to principles known in the art. As discussed in greater detail below, containers 18 and 20 are movably disposed such that they may be situated at different locations along flat bed 16.

A plurality of axles support the load disposed on flat bed 16. Specifically, trailer 14 includes two spaced-apart rear axles 22 and 24. Additionally, tractor/truck 12 includes three axles 26, 28 and 30, with axles 26 and 28 being situated in tandem. While the embodiment illustrated in FIG. 1, therefore, provides for the support of a flat bed load on four axles 22, 24, 26 and 28, it should be appreciated that any number of different axle configurations could be provided in connection with either trailer 14 or tractor/truck 12 without departing from the spirit and scope of the intended invention.

In operation, vehicle 10 is utilized to alternatively transport either a first or second substance from a source location to a destination. In particular, containers 18 and 20 are preferably constructed to store different types of substances, respectively, that may not be carried in the same type of container. For example, as stated above, first container 18 is particularly suited to store fluids while second container 20 is particularly suited to store dry materials.

Preferably, only one container 18 or 20 stores a substance at a time, and the substance-carrying container is moved along trailer 14 to achieve optimal load distribution prior to transportation of the substance. The specific transfer apparatus used for moving containers 18 and 20 is discussed in greater detail below. The balanced load result of the present invention ensures compliance with rules and regulations governing the transportation of substances on large trucks. In addition to regulatory compliance, the balanced load distribution minimizes the burden on the various mechanical components of vehicle 10, thereby lessening the need for vehicle maintenance and prolonging the life span of its various component parts.

FIGS. 2 and 3 illustrate specific examples of the preferable locations for containers 18 and 20 for transporting stored materials. Specifically, FIG. 2 illustrates an instance where it is desirable to transport a fluid from one location to another. In particular, the fluid is disposed within first container 18 for transportation while second container 20 remains empty. In order to store fluid within first container 18 and transport it in a balanced manner, second container 20, which will remain empty, is moved via a transfer apparatus to rear end 14b of trailer 14. First container 18 is moved via a transfer apparatus, and preferably prior to being filled, to a central area 32 along flat bed 16. Central area 32 is defined as the area in which optimum load distribution occurs between axles 22, 24, 26, 28 and 30, taking into consideration the more significant weight contributions such as the weight attributable to bed 16, as well as containers 18 or 20 in their full state. Once container 18 is correctly positioned, fluid is stored within container 18. Having been previously moved to a balanced load distribution point, the storage of liquid will not cause an imbalance of load or undue weight distribution on axles 22–28 of vehicle 10. Accordingly, the location of container 18 provides optimum balance of weight distribution across each of the axles of vehicle 10 and permits efficient and safe transportation of the fluid. Once the fluid is transported to its destination, it is removed from container 18 in accordance with steps known in the art.

As another illustration, FIG. 3 depicts the respective locations for containers 18 and 20 where container 18 is empty and container 20 has material stored therein. In this scenario, container 18 is moved to front end 14a of trailer 14 while container 20 is disposed in central area 32. Preferably, containers 18 and 20 are moved prior to filling container 20.

Thereafter, a substance, such as ore, is loaded into container 20 for transporting it to a destination location. Again, it should be appreciated that the respective locations of containers 18 and 20 provide for an optimum balance of load distribution across the various axles of vehicle 10.

With respect to both FIGS. 2 and 3, the movement of containers 18 and 20 has been described individually. It should be noted, and is discussed in greater detail below, that the preferred embodiment further includes apparatus to couple containers 18 and 20 together at a predetermined distance from one another. Thus, movement of either one of containers 18 or 20 ensures a corresponding movement of the other. This feature provides additional load stability and minimizes the possibility of human error.

FIG. 4 illustrates an additional concept in connection with the present invention. In particular, FIG. 4 illustrates vehicle 10 in a dumping mode of operation. Specifically, vehicle 10 has a lifting mechanism 34 disposed between flat bed 16 and a tilting base 36. Tilting base 36 recedes between the parallel surfaces of flat bed 16 when it is not in operation. In the preferred embodiment, lifting mechanism 34 is a hydraulic device constructed according to principles known in the art. Container 20 further includes a tailgate 40 at the rear end of container 20. A hinge 42 is connected between the top of tailgate 40 and the top of container 20.

In operation, according to the situation of FIG. 4, once vehicle 10 has arrived at the destination to where a substance 38 in container 20 is to be distributed, second container 20 is moved to rear end 14b of trailer 14. This position causes container 20 to overlie tilting base 36. Accordingly, once container 20 is moved to rear end 14b of trailer 14, lifting mechanism 34 is operated in order to incline tilting base 36. Tilting base 36, thus, ascends from flat bed 14 to lift container 20, thereby causing tailgate 40 to open and substance 38 to be exhausted for dumping purposes or the like.

FIG. 5 illustrates a cross-sectional longitudinal side view along the center of trailer 14. In particular, FIG. 5 illustrates a chain 44 (shown in phantom) which circles between a winch 46 and a chain tensioner 48. Chain 44 further passes through chain guides, denoted at 50. Chain 44 is connected to a carrier plate 52. Carrier plate 52 physically communicates with, and is guided by, a plate guide 53 which extends between winch 46 and chain tensioner 48. Carrier plate 52 also has a vertical pin 54 disposed thereon. In the preferred embodiment, carrier plate 52 and vertical pin 54 are constructed of a rugged material, such as steel.

Container 20 has a frontal cross-member 56 disposed along its bottom width. Frontal cross-member 56 is attached to a guiding plate 58 which has an aperture which communicates with vertical pin 54. Container 20 also includes a plurality of wheels 60 (other wheels not illustrated) which support container 20, and facilitate movement along flat bed 16.

The mechanism of FIG. 5 operates in order to move container 20 along flat bed 16. One should also appreciate that, in the preferred embodiment, container 20 is coupled to container 18. Thus, operation of the FIG. 5 mechanism causes concurrent movement of container 20 in addition to container 18.

Specifically, winch 46 receives hydraulic pressure from a predetermined source, such as the transmission of tractor/truck 12 illustrated in FIGS. 1–4 above. Such transfer of hydraulic force into rotary force is well known in the art. Accordingly, winch 46 will rotate, thereby causing chain 44 to move linearly which further causes carrier plate 52 to also advance in a linear fashion along guide 53. Thus, in the example shown in FIG. 5, if winch 46 were to rotate in a counterclockwise fashion, then carrier plate 52 would advance from right to left. As stated above, vertical pin 54, associated with carrier plate 52, directly communicates with guiding plate 58 of container 20. Thus, it should be appreciated that any linear movement of carrier plate 52 and pin 54 will cause a corresponding movement of guiding plate 58 and container 20. In addition, wheels 60 of container 20 facilitate a lesser coefficient of friction between container 20 and flat bed 16. Clearly, however, other types of interfacing between container 20 and flat bed 16 could be contemplated by one skilled in the art.

One particularly advantageous feature of the use of guiding plate 58, which communicates via its aperture to vertical pin 54, is its relationship to the tilting function described above in connection with FIG. 4. Specifically, recall that one aspect of the present invention provides for a mechanism by which container 20 may be tilted upward in order to exhaust substance 38 from container 20. During this lifting operation, guiding plate 58 will be lifted off of vertical pin 54. Thus, tilting of container 20 may be accomplished without disturbing the mechanism used for moving container 20 along flat bed 16. Once container 20 is lowered back to its resting position along flat bed 16, the aperture within guiding plate 58 will again center around pin 54, thereby permitting subsequent movement of container 20.

FIG. 6 illustrates a cross-sectional longitudinal side view along the center of trailer 14, as well as containers 18 and 20. Also illustrated is the general apparatus utilized to couple containers 18 and 20 together, as well as to individually couple the containers in place for purposes of transportation. For purposes of explanation, first container 18 is defined in terms of its front end 62 and its rear end 64. Similarly, second container 20 is defined in terms of its front end 66, while its rear end is not illustrated.

A first pintle eyelet 68 is attached to a mounting plate 70 which, in turn, is connected to front end 62 of container 18. In the preferred embodiment, eyelet 68 is attached to container 18 via a plurality of bolts, as illustrated. Eyelet 68 includes a vertical aperture 72, illustrated in phantom. A coupler 74 is affixed to trailer 14 near front end 14a via a plurality of bolts, as illustrated. Coupler 74 further includes a hook member 75. Hook member 75 may be mechanically interlocked with aperture 72 of pintle eyelet 68. Coupler 74 further includes a release mechanism (not shown) for disengaging hook member 75 from eyelet 68.

An elongated mounting bracket 76 extends longitudinally along trailer 14 toward second container 20, and is connected to rear end 64 of container 18. A second pintle eyelet 78 is connected to mounting bracket 76 and is disposed in the direction toward container 20. Pintle eyelet 78 is affixed to mounting bracket 76, in the preferred embodiment, via a plurality of bolts. Pintle eyelet 78 includes a vertically disposed aperture 80, shown in phantom. An additional mounting bracket 82 is connected to elongated mounting bracket 76, and is also disposed generally in the direction toward second container 20. Mounting bracket 82 may be affixed to mounting bracket 76 in any of a number of ways as known in the art, such as welding, or by mechanical hardware, such as bolts. A third pintle eyelet 84 is affixed to mounting bracket 82 and also is disposed in a direction toward the rear end 14b of trailer 14. Pintle eyelet 84, like eyelets 68 and 78, also includes a vertical aperture 86, shown in phantom. Further, eyelet 84 is preferably connected to mounting bracket 82 via a plurality of bolts.

An L-shaped mounting bracket 88 is affixed to front end 66 of second container 20 such that it extends first toward container 18 and then vertically upward. A second automatic coupler 90 is affixed to mounting bracket 88 and extends toward pintle eyelet 78. Automatic coupler 90 is of the same construction as automatic coupler 74 and, therefore, includes a hook member 92 which is capable of interlocking through the aperture 80 of eyelet 78. In addition, automatic coupler 90 includes a releasing mechanism (not shown) so that hook member 92 may be disengaged from eyelet 78.

An L-shaped mounting bracket 94 is affixed to the chassis of trailer 14 such that it is affixed horizontally thereto and extends vertically. Specifically, bracket 94 is preferably affixed to trailer 14 via a plurality of bolts, as illustrated. In addition, a third automatic coupler 96 is connected to mounting bracket 94 and is disposed toward pintle eyelet 84. Automatic coupler 96 is constructed in the same fashion as couplers 74 and 90 and, therefore, includes a hook member 98, as well as a disengaging mechanism (not shown) in order to permit mechanical interconnection/disconnection of coupler 96 with aperture 86 of eyelet 84.

FIG. 6 also illustrates the preferred interface for movement of container 18 over flat bed 16. Specifically, trailer 14 includes a pair of longitudinal rails 100 along flat bed 16. Because FIG. 6 illustrates a longitudinal cross-section down the middle of trailer 14, only one rail 100 is shown. In the preferred embodiment, rails 100 are orthogonally attached to respective surfaces of the two parallel surfaces of flat bed 16. Tank 18 also includes a pair of lower rails 102 disposed longitudinally at its bottom. Each rail 102 includes an outer L-shaped member 104 which extends outwardly from rail 102, and then vertically downward along the outer side of rail 100. L-shaped member 104 is not immediately visible due to the perspective of FIG. 6 and, therefore, is shown in phantom. It also should be noted that a flat bearing (not shown) is disposed between rail 102 and rail 100 to minimize the friction between the two rails.

In operation, automatic couplers 74, 90 and 96, shown in FIG. 6, provide additional stability and moveability of containers 18 and 20, as discussed generally above. In particular, as stated above in connection with FIGS. 2 and 3, in the preferred embodiment, containers 18 and 20 move simultaneously. Accordingly, one should appreciate from a review of FIG. 6 that to accomplish this simultaneous movement, containers 18 and 20 are brought together until eyelet 78 interlocks with automatic coupler 90. Movement of container 18 occurs as rails 102 of container 18 physically communicate with rails 100 of trailer 14. Movement of container 20 occurs as wheels 60 rotate. Once containers 18 and 20 are coupled together, the apparatus discussed above in connection with FIG. 5 may be used to move container 20 along the length of trailer 14. Therefore, having previously coupled container 20 to container 18, any linear movement of container 20 will create a corresponding linear movement of container 18. Thus, returning briefly to FIGS. 2 and 3, it may be appreciated that when moving container 20 from right to left, as illustrated in the transition from FIGS. 2 to 3, container 18 will automatically move as well. This dual movement permits for an accurate transfer of weight distribution for both containers 18 and 20. In addition, by maintaining a fixed distance between containers 18 and 20, an operator of vehicle 10 may be assured of optimum weight distribution. This assured weight distribution is very important when dealing with weights on the order of 40,000 to 50,000 pounds, as a tolerance on the order of three to five inches could easily cause violation of safety guidelines, rules and regulations.

Having explained the ability to simultaneously move containers 18 and 20, reference is now made to the stability purpose accomplished by couplers 74 and 96. In particular, coupler 74 is disposed at end 14a of trailer 14 for purposes of maintaining containers 18 and 20 in one of their appropriate positions, as illustrated in FIG. 3 above. More particularly, one should appreciate from a review of FIGS. 3 and 6 that, having moved container 18 to end 14a of trailer 14, eyelet 72 will interlock with automatic coupler 74. This attachment maintains container 18 and, consequently, container 20 which is coupled to container 18, in the fixed position illustrated in FIG. 3 above. Automatic coupler 96, being disposed toward end 14b of trailer 14, provides a similar effect in order to assure appropriate positioning of containers 18 and 20, as illustrated in FIG. 2. More specifically, automatic coupler 96 is situated at a distance along trailer 14 so that once containers 20 and 18 are moved from left to right, eyelet 84 will interlock with automatic coupler 96, thereby maintaining containers 18 and 20 in the position illustrated in FIGS. 2 and 4 above.

It should be noted that the bracket and coupling features shown in FIG. 6 are chosen for purposes of illustration. Thus, a person skilled in the art could choose alternative types of coupling mechanisms and/or additional types of bracketry or affixation apparatus to accomplish the benefits and goals derived from those illustrated in FIG. 6. While these changes could be made, it should be understood that they would in no way depart from the intended scope of the present invention.

In addition to automatic couplers 74 and 96, the preferred embodiment further includes a series of wedge members and spring brake locks, both known in the mechanical coupling art, for purposes of maintaining containers 18 and 20 in an affixed position. Specifically, the wedge blocks prevent containers 18 and 20 from moving sideways or vertically on trailer 14. In addition, the spring brake lock system provides a redundant feature to further assure that containers 18 and 20 remain in their desired fixed positions in order to maximize safety in transportation of materials.

FIG. 7 illustrates the rear end 106 of container 20. As shown in FIG. 4 above, container 20 includes a tailgate 40 which may be opened in order to access the substance or materials stored within container 20. One additional aspect of the present invention, however, is to include a dual hinging system on tailgate 40 so that these materials may be accessed in one of two different ways. In particular, a pair of hinges 108 and 110 are connected between the top of tailgate 40 and the top of container 20. Each of hinges 108 and 110 has a respective pin 112 and 114 disposed axially through the hinge. Container 20 further includes a second pair of hinges 116 and 118 connected between one side of tailgate 40 and a side of container 20. Hinges 116 and 118 both also include respective pins 120 and 122 disposed axially through each respective hinge.

The hinging connection described in connection with FIG. 7 permits two different modes of tailgate operation for container 20. More specifically, one pair of hinges 108 and 110, or 116 and 118, may be disengaged by removing their respective pins, thereby leaving tailgate 40 to open about the non-disengaged hinges. For example, in order to allow tailgate 40 to open vertically about hinges 108 and 110, pins 120 and 122 are removed from hinges 116 and 118, respectively. Having removed those pins, tailgate 40 is free to open about hinges 108 and 110. This type of configuration would be desirable in order to accomplish the dumping function illustrated in FIG. 4 above. If, however, side entry, such as for the use of a forklift, is desired for accessing container 20, then hinges 108 and 110 are disengaged by removing pins 112 and 114, respectively (while leaving hinges 116 and 118 engaged). As a result, having disengaged hinges 108 and 110, tailgate 40 may be opened from right to left about hinges 116 and 118. Thus, the configuration illustrated in FIG. 7 permits dual modes of access to the contents stored in container 20. Further, it should be noted that while hinge pairs are illustrated as the swinging mechanism for the interaction between container 20 and tailgate 40, alternative configurations, such as single hinges or other arrangements contemplated by one skilled in the art, could be used without departing from the inventive feature illustrated therein.

From the above, one can appreciate that the present invention provides various features and advantages over the prior art. Vehicle 10 of the present invention has particularly advantageous use in mining operations. Specifically, mining operations commonly require the transportation of an acid from a storage site to the mine. As the ore is mined, there is an additional need to transport the mined ore to a destination location. Quite often, the destination location for the ore is the same storage site from which the mining acid was obtained. Thus, vehicle 10 provides immense efficiency in this instance because mining acid can be transported from the storage site to the mine, and the same vehicle can be used to return to the storage site with the mined ore. As a result, only one vehicle is needed for both trips. Thus, fuel consumption is minimized, as is the wear and tear on the vehicle. Further, only one driver is needed for the vehicle rather than requiring separate drivers for separate single-substance vehicles.

Although the present invention and its advantages have been described in detail, it should be understood that various changes, substitutions and alterations can be made herein without departing from the spirit and scope of the invention. For example, while containers 18 and 20 have been described as preferably comprising a tank and hopper, respectively, one skilled in the art could choose alternative types of enclosures. As yet another example, a person of skill in the art could select a transfer apparatus other than the hydraulic-driven chain apparatus described herein. Still other examples too numerous to list also follow from the previous description, and in no way should depart from the scope of the present invention as defined by the following claims.

What is claimed is:

1. A trailer for selectively transporting either a first or second substance, comprising:

a plurality of axles;

a substantially flat surface supported by said plurality of axles and having a front end, a rear end, a length between said front end and said rear end, and a balanced load distribution area between said front and rear ends, wherein said plurality of axles supports a weight and said balanced load distribution area is located at a point along said flat surface where said weight is substantially evenly distributed among said plurality of axles;

a first container for storing said first substance, said first container being movably disposed along said flat surface;

a second container for storing said second substance, said second container being movably disposed along said flat surface;

wherein said length of said surface is sufficiently long so that:

in a first relative position for transporting said first substance, wherein in said first relative position said first container is located at approximately said balanced load distribution area of said flat surface and wherein in said first relative position said second container is located at approximately said front end and away from said balanced load distribution area, a first distance from the midsection of said first container to said rear end exceeds a second distance from the midsection of said second container to said front end;

and so that:

in a second relative position for transporting said second substance, wherein in said second relative position said second container is located at approximately said balanced load distribution area of said flat surface and wherein in said second relative position said first container is located at approximately said rear end and away from said balanced load distribution area, a third distance from the midsection of said second container to said front end exceeds a fourth distance from the midsection of said first container to said rear end.

2. The trailer of claim 1 and further comprising a plurality of wheels connected to said first container such that said first container is moveable by rolling along said flat surface.

3. The trailer of claim 1 and further comprising:

a rail longitudinally disposed along said flat surface; and a rail connected to said first container and mateable with said rail of said flat surface such that said first container is moveable by sliding along said rail of said flat surface.

4. The trailer of claim 1 and further comprising a tilting base recessed within a plane defined by said flat surface and disposed at said rear end of said flat surface, wherein said first container is moveable over said tilting base such that said tilting base can be inclined to incline said first container.

5. The trailer of claim 4 and further comprising a hydraulic lifting device connected between said trailer and said tilting base for inclining said tilting base at an angle upward from said flat surface.

6. The trailer of claim 1 and further comprising:

a first interlocking device connected to said first container; and a second interlocking device connected to said second container; and means for simultaneously moving said first and second containers along said flat surface.

7. The trailer of claim 1 and further comprising:

a first interlocking device connected to said first container;

a second interlocking device connected to said rear end of said flat surface and operable to couple to said first interlocking device for maintaining said first container in said second relative position near said rear end;

a third interlocking device connected to said first container;

a fourth interlocking device connected to said flat surface and operable to couple to said third interlocking device for maintaining said first container in said first relative position at approximately said balanced load distribution area.

8. The trailer of claim 1 wherein said first container comprises a tank.

9. The trailer of claim 1 wherein said first container comprises a hopper.

10. The trailer of claim 9 wherein said first container comprises:

an enclosed member for storing said first substance;

a tailgate connected by hinging apparatus to said enclosed member such that said tailgate may be opened to access said first substance, wherein said tailgate includes a top, bottom, and first and second sides, and said hinging apparatus is for opening said tailgate in one of two ways, wherein said hinging apparatus comprises:

a first hinge connected between said top of said tailgate and said enclosed member such that said tailgate may be opened about said first hinge; and a second hinge connected between said first side of said tailgate and said enclosed member such that said tailgate may be opened about said second hinge.

11. A trailer for selectively transporting either a liquid or a dry material, comprising:

a plurality of axles;

a substantially flat bed having a length and supported by said plurality of axles and comprising a pair of longitudinal parallel surfaces, each of said surfaces having a front end, a rear end and a balanced load distribution area between said front and rear ends, wherein said plurality of axles supports a weight and said balanced load distribution area is located at a point along said flat bed where said weight is substantially evenly distributed among said plurality of axles;

a tank for storing said liquid, said tank being movably disposed on said bed;

a hopper for storing said dry material, said hopper being movably disposed on said bed; and means for moving said tank and said hopper along said length, wherein said length is sufficiently long so that:
said means for moving is operable to locate said tank and hopper in a first relative position for transporting said dry material, wherein in said first relative position said hopper is located at approximately said balanced load distribution area of said bed and said tank is located at approximately said front end and away from said balanced load distribution area, and such that in said first relative position a first distance from the midsection of said hopper to said rear end exceeds a second distance from the midsection of said tank to said front end;

and so that:
said means for moving is operable to locate said tank and hopper in a second relative position for transporting said liquid, wherein in said second relative position said tank is located at approximately said balanced load distribution area of said bed and said hopper is located at approximately said rear end and away from said balanced load distribution area, and such that in said second relative position a third distance from the midsection of said tank to said front end exceeds a fourth distance from the midsection of said hopper to said rear end.

12. The trailer of claim 11 and further comprising:

a plurality of wheels connected to said hopper such that said hopper is moveable by rolling along said parallel surfaces;

a pair of rails longitudinally disposed along said flat bed wherein each rail is disposed along a respective one of said parallel surfaces; and a plurality of rails connected to said tank and mateable with said rails of said flat bed such that said tank is moveable by sliding along said rails of said flat bed.

13. The trailer of claim 11 and further comprising a tilting base recessed within said flat bed and disposed at said rear end of said flat bed, wherein said hopper is moveable over said tilting base such that said tilting base can be inclined to incline said hopper.

14. The trailer of claim 13 and further comprising a hydraulic lifting device connected between said trailer and said tilting base for inclining said tilting base at an angle upward from said flat bed.

15. The trailer of claim 11 and further comprising:

a first interlocking device connected to said tank; and a second interlocking device connected to said hopper, wherein said first and second interlocking devices are operable to couple to one another such that movement of said hopper causes a corresponding movement of said tank.

16. A method of transporting first and second substances on a trailer, said trailer comprising a plurality of axles and having first and second containers of different types, each of said containers being movable from a first and second end of said trailer, respectively, to a balanced load distribution area between said first and second ends, wherein said plurality of axles supports said trailer, said first and second substances and said first and second containers and said balanced load distribution area is located along said trailer at a point where the weight of said trailer and of said first and second substances and said first and second containers is substantially evenly distributed among said plurality of axles, comprising the steps of:

positioning said first container at said balanced load distribution area and said second container at said second end and away from said balanced load distribution area;

loading said first substance in said first container while maintaining said second container empty;

transporting said first substance to a first destination while maintaining said second container empty; and unloading said first substance at said first destination.

17. The method of claim 16 wherein said positioning step occurs before said loading step.

18. The method of claim 16 and further comprising tilting the first container for the first substance such that the first substance is exhausted from the first container.

19. The method of claim 16 and further comprising the steps of:

positioning said second container at said balanced load distribution area and said first container at said first end and away from said balanced load distribution area;

loading said second substance in said second container while maintaining said first container empty;

transporting said second substance to a second destination while maintaining said first container empty; and unloading said second substance at said second destination.

20. The method of claim 19 wherein said step of positioning said first container at said balanced load distribution area and said second container at said second end comprises positioning said first and second containers concurrently, and wherein said step of positioning said second container at said balanced load distribution area and said first container at said first end comprises positioning said first and second containers concurrently.

21. The method of claim 19 wherein said first positioning step comprises sliding the container for the first substance along a rail attached to the trailer, and wherein said second positioning step comprises moving the second container such that wheels attached to the container roll along the trailer.

22. A trailer for selectively transporting either a first or second substance, comprising:

a substantially flat surface having a first end, a second end and a balanced load distribution area between said first and second ends;

a hopper for storing said first substance, said hopper being movably disposed along said flat surface;

a container for storing said second substance, said container being movably disposed along said flat surface;

wherein said hopper is moved to approximately said balanced load distribution area of said flat surface and said container is moved to approximately said first end for transporting said first substance;

wherein said container is moved to approximately said balanced load distribution area of said flat surface and said hopper is moved to approximately said second end for transporting said second substance; and wherein said hopper comprises:

an enclosed member for storing said first substance;

a tailgate connected by hinging apparatus to said enclosed member such that said tailgate may be opened to access said first substance, wherein said tailgate includes a top, bottom, and first and second sides, and said hinging apparatus is for opening said tailgate in one of two ways, wherein said hinging apparatus comprises:

a first hinge connected between said top of said tailgate and said enclosed member such that said tailgate may be opened about said first hinge; and a second hinge connected between said first side of said tailgate and said enclosed member such that said tailgate may be opened about said second hinge.

* * * * *